US010075692B2

(12) United States Patent
Chen et al.

(10) Patent No.: US 10,075,692 B2
(45) Date of Patent: Sep. 11, 2018

(54) METHOD OF SIMPLE INTRA MODE FOR VIDEO CODING

(71) Applicant: HFI Innovation Inc., Zhubei, Hshinchu County (TW)

(72) Inventors: Yi-Wen Chen, Taichung (TW); Jian-Liang Lin, Su'ao Township, Yilan County (TW)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 221 days.

(21) Appl. No.: 14/993,372

(22) Filed: Jan. 12, 2016

(65) Prior Publication Data

US 2016/0219261 A1   Jul. 28, 2016

Related U.S. Application Data

(60) Provisional application No. 62/108,634, filed on Jan. 28, 2015.

(51) Int. Cl.
| | |
|---|---|
| *H04N 19/176* | (2014.01) |
| *H04N 19/593* | (2014.01) |
| *H04N 19/597* | (2014.01) |
| *H04N 19/105* | (2014.01) |
| *H04N 19/503* | (2014.01) |
| *H04N 13/00* | (2018.01) |
| *H04N 19/11* | (2014.01) |
| *H04N 19/463* | (2014.01) |

(52) U.S. Cl.
CPC ..... *H04N 13/0048* (2013.01); *H04N 13/0059* (2013.01); *H04N 19/11* (2014.11); *H04N 19/176* (2014.11); *H04N 19/463* (2014.11); *H04N 19/593* (2014.11); *H04N 19/597* (2014.11)

(58) Field of Classification Search
CPC .......... H04N 13/0048; H04N 13/0059; H04N 19/176; H04N 19/593; H04N 19/597; H04N 19/105; H04N 19/503
USPC ................................................... 375/240.12
See application file for complete search history.

(56) References Cited

U.S. PATENT DOCUMENTS

2006/0104354 A1* 5/2006 Han ............... H04N 19/159
                                                    375/240.03
2013/0003840 A1* 1/2013 Gao ............... H04N 19/50
                                                    375/240.12

(Continued)

*Primary Examiner* — Jay Patel
*Assistant Examiner* — Salame Amr
(74) *Attorney, Agent, or Firm* — McClure, Qualey & Rodack, LLP

(57) ABSTRACT

A method and apparatus for video coding of a block of depth data or texture data using a simple Intra mode is disclosed. The method determines a prediction process selected from a prediction process list for the current block, where the prediction process list comprises at least a single sample mode and at least a simplified Intra prediction mode. If the prediction process selected for the current block corresponds to one single sample mode, encoding or decoding the current block using a single sample value derived from one or more previously decoded pixels for a whole current block. If the prediction process selected for the current block corresponds to one simplified Intra prediction mode, encoding or decoding the current block using Intra prediction signal derived according to a corresponding Intra prediction mode with no residual coding for the current block.

17 Claims, 3 Drawing Sheets

(56) References Cited

U.S. PATENT DOCUMENTS

| | | | |
|---|---|---|---|
| 2013/0003864 A1* | 1/2013 | Sullivan | H04N 19/44 375/240.25 |
| 2013/0114707 A1* | 5/2013 | Seregin | H04N 19/11 375/240.12 |
| 2014/0169475 A1* | 6/2014 | Zhang | H04N 19/597 375/240.16 |
| 2015/0365699 A1* | 12/2015 | Lin | H04N 19/597 375/240.12 |
| 2016/0073132 A1* | 3/2016 | Zhang | H04N 19/597 375/240.12 |

* cited by examiner

METHOD OF SIMPLE INTRA MODE FOR VIDEO CODING

CROSS REFERENCE TO RELATED APPLICATIONS

The present invention claims priority to U.S. Provisional Patent Application, Ser. No. 62/108,634, filed on Jan. 28, 2015. The U.S. Provisional Patent Applications is hereby incorporated by reference in its entirety.

FIELD OF THE INVENTION

The present invention relates to video coding. In particular, the present invention relates to coding techniques associated with Intra prediction for blocks with smooth characteristics such as depth blocks or texture blocks corresponding to screen contents.

BACKGROUND AND RELATED ART

Three-dimensional (3D) television has been a technology trend in recent years that is targeted to bring viewers sensational viewing experience. Multi-view video is a technique to capture and render 3D video. The multi-view video is typically created by capturing a scene using multiple cameras simultaneously, where the multiple cameras are properly located so that each camera captures the scene from one viewpoint. The multi-view video with a large number of video sequences associated with the views represents a massive amount data. Accordingly, the multi-view video will require a large storage space to store and/or a high bandwidth to transmit. Therefore, multi-view video coding techniques have been developed in the field to reduce the required storage space and the transmission bandwidth. In three-dimensional and multi-view coding systems, the texture data as well as depth data are coded.

Currently, extensions of HEVC (High Efficiency Video Coding) are being developed, including range extensions (RExt) and 3D extensions. The range extension targets at non-4:2:0 color formats, such as 4:2:2 and 4:4:4, and video data with higher bit-depths such as 12, 14 and 16 bit-per-sample while the 3D extension targets at the coding of multi-view video with depth data.

One of the most likely applications utilizing RExt is screen sharing over wired-connection or wireless. Due to specific characteristics of screen-content, coding tools have been developed that demonstrated significant gains in coding efficiency. Among them, the palette coding (a.k.a. major color based coding) techniques represent block of pixels using indices to the palette (major colors), and encode the palette and the indices by exploiting spatial redundancy as disclosed in JCTVC-P0249 (Sun et al., "*Non-RCE4: A combination of the four-neighbor major color index prediction in JCTVC-*P0098 *and a simplified transition copy mode from JCTVC-*P0115 *on top of RCE4 Test*1", Joint Collaborative Team on Video Coding (JCT-VC) of ITU-T SG 16 WP 3 and ISO/IEC JTC 1/SC 29/WG 11, 16th Meeting: San José, US, 9-17 Jan. 2014, Document: JCTVC-P0249).

In order to support the auto-stereoscopic multi-view display more practically, multi-view video plus depth (MVD) format was introduced as a new 3D video format as disclosed in JCT3C-G1005 (Zhang et al, *Test Model 7 of* 3*D-HEVC and MV-HEVC*, Joint Collaborative Team on 3D Video Coding Extensions of ITU-T SG 16 WP 3 and ISO/IEC JTC 1/SC 29/WG, 7th Meeting: San José, US, 11-17 Jan. 2014, Document: JCT3V-G1005). The MVD format consists of a texture image and its associated depth map. Unlike a texture image representing the luminance and chrominance information of an object, a depth map presents the distance between an object and a camera as a gray scale image. The depth map is generally employed for virtual view rendering as non-visual information. Since the MVD format enables the 3D display to generate virtual texture images for arbitrary views by using the depth image based rendering (DIBR) technique, only a small number of views need to be transmitted. Due to these advantages, the MVD format is being widely used as a codec input for the 3D video coding.

Due to the signal characteristics of the depth map or screen contents, it is desirable to develop coding techniques to take advantage of the nature of smooth areas in the depth map or screen contents to further improve the coding efficiency.

BRIEF SUMMARY OF THE INVENTION

A method and apparatus for video coding of a block of depth data or texture data using a simple Intra mode is disclosed. The method determines a prediction process selected from a prediction process list for the current block, where the prediction process list comprises at least a single sample mode and at least a simplified Intra prediction mode. If the prediction process selected for the current block corresponds to one single sample mode, encoding or decoding the current block using a single sample value derived from one or more previously decoded pixels for a whole current block. If the prediction process selected for the current block corresponds to one simplified Intra prediction mode, encoding or decoding the current block using Intra prediction signal derived according to a corresponding Intra prediction mode with no residual coding for the current block.

The prediction process selected can be indicated by a prediction index derived or signaled for the current block. The prediction index can be signaled when the current block is coded as the simplified Intra prediction mode. Furthermore, the prediction index can be context coded using a truncated unary (TU) binarization process. If a size of the prediction process list for the current block is equal to or less than one, a prediction index for indicating the prediction process selected is not signaled.

A prediction process list can be constructed for the current block by inserting different prediction processes in a predefined order into the prediction process list. The single sample value and/or the Intra prediction signal may correspond to one or more spatial sample candidates, one or more temporal candidates or one or more inter-view candidates. The single sample value and/or the Intra prediction signal may also correspond to one or more additional candidates derived by adding one or more offset values to one or more available texture candidates, or correspond to one or more additional candidates with a default sample value. A same offset value can be added to all color components of each of the available texture candidates or different offset values can be added to different color components of each of the available texture candidates. The single sample value and/or the Intra prediction signal may correspond to one or more additional candidates derived by adding an offset depth value to an available depth candidate or correspond to one or more additional candidates with a default sample value.

One or more syntax element can be signaled to control enabling or disabling of the simple Intra mode and syntax elements can be signaled in a coding unit (CU).

The size of the prediction process list can be fixed or adaptively determined for the current block. The size of the prediction process list for the current block can be determined implicitly according to a same derivation process at both an encoder side and a decoder side. The size of the prediction process list for the current block can also be signaled explicitly in a bitstream at a sequence level, view level, a picture level, a slice level or a block level. The size of the prediction process list for the current block can be fixed to a positive integer number N, and N is pre-specified or signaled in a bitstream. When the number of available prediction processes is less than N, another single sample mode with one or more additional candidates or default candidates can be added to the prediction process list. When the number of available prediction processes is larger than N, only first N prediction processes according to a priority order are included in the prediction process list. The priority order can be pre-defied or adaptively derived according to statistics of prediction index indicating the prediction process selected for coded blocks.

DETAILED DESCRIPTION OF THE INVENTION

Figure 1:
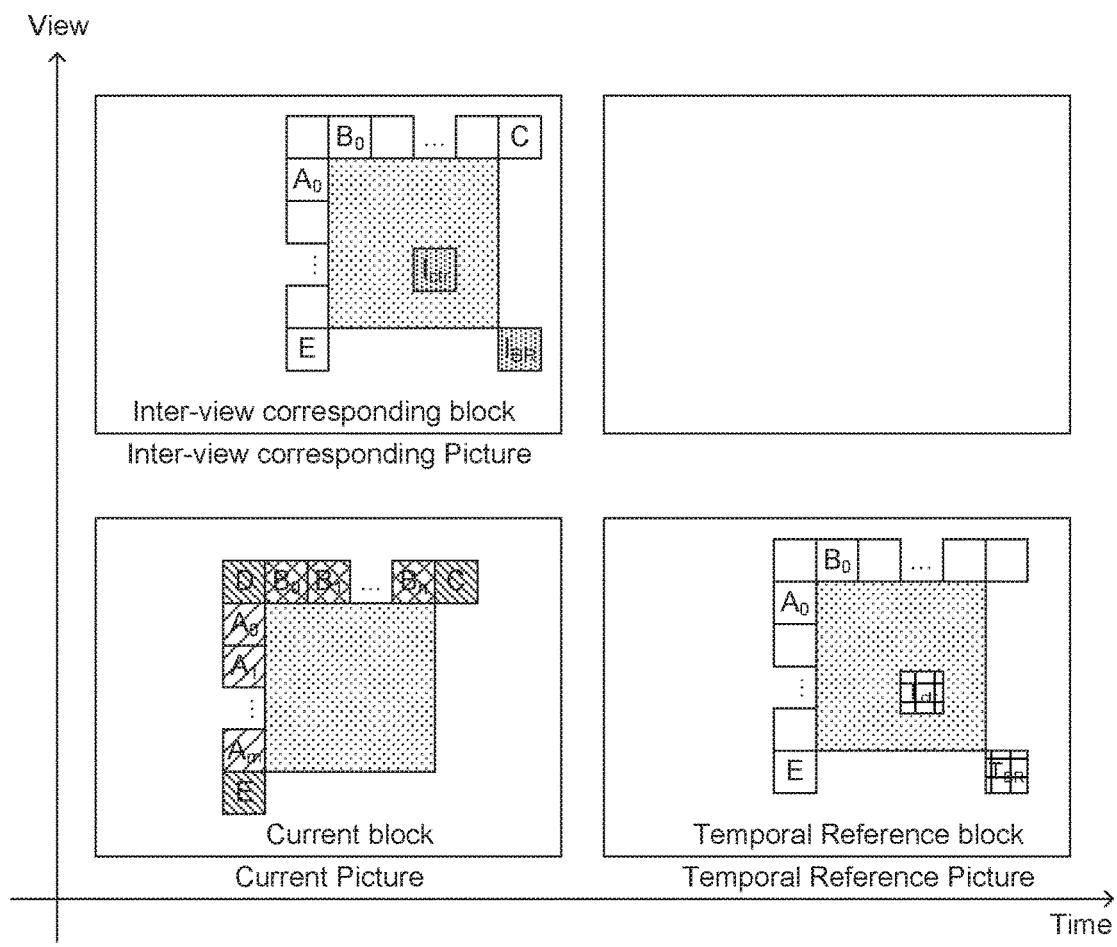
FIG. 1 illustrates an example of the sample candidates for Single Sample Mode derived from spatial sample candidates of the current picture, temporal sample candidates of a temporal reference picture and inter-view sample candidates of an inter-view reference picture.

The following description is of the best-contemplated mode of carrying out the invention. This description is made for the purpose of illustrating the general principles of the invention and should not be taken in a limiting sense. The scope of the invention is best determined by reference to the appended claims.

In the present invention, a coding mode termed as "Simple Intra Prediction Mode" for coding smooth areas within a picture efficiently is disclosed. The Simple Intra Prediction Mode is also referred to as the Simple Intra Mode for convenience. The motivation of Simple Intra Mode is simply to reconstruct the current block as a block with single pixel value or to reconstruct the current block using the conventional Intra prediction mode, such as that used in HEVC/H.265, without residual coding. The conventional Intra prediction mode without residual coding is referred to as Simplified Intra Prediction Mode in this disclosure. The pixel can be in any color format, such as YUV444, YUV420, YUV422, YUV400 or RGB. The pixel value used to fill up the current block can be derived from the previously decoded pixels.

A prediction method list is first constructed for a block coded as the Simple Intra Mode or Simple Intra Prediction Mode. A prediction method list is also referred to as prediction process list in this disclosure. The block is then predicted with the selected prediction process selected from the prediction process list. The detail of the Simple Intra Prediction mode is described as below.

Construction of Prediction Process List

A list of prediction methods or prediction processes is first constructed for a block coded in the Simple Intra Mode. The size of the list of prediction methods or processes, also termed as prediction list for convenience, can be fixed or adaptive.

The prediction list is constructed by inserting candidates associated with different prediction processes in a predefined order into the prediction list. The prediction process may correspond to simply filling the current block with one sample value derived from the neighboring pixels of current coding block or reconstructing the current block with the conventional Intra prediction modes as used in HEVC/H.265, but without residual coding.

Single Sample Mode

The process of filling the current block with one sample value selected from the neighboring pixels is referred as Single Sample Mode in this disclosure. The Single Sample Mode in the present invention is applicable to depth data as well as texture data such as screen content data. The sample candidates can be selected from the neighboring pixels of current coding block. According to the picture type of the neighboring pixels, the sample candidates can be classified into several different types, such as spatial sample candidates from the current picture, temporal sample candidates from a temporal reference picture and inter-view sample candidates from an inter-view reference picture (also referred to as inter-view corresponding picture), as shown in FIG. 1.

Spatial Sample Candidates

As shown in FIG. 1, the spatial neighboring pixels comprise those reconstructed pixels around the current block in current picture, such as pixels $A_0$-$A_m$, $B_0$-$B_n$, D, C and E in the current picture as shown in FIG. 1. In FIG. 1, each small square represents one pixel. The spatial sample candidates may also include other spatial reconstructed pixels.

Temporal Sample Candidates

The temporal neighboring pixels are those pixels located in the temporal reference picture of the current block, such as pixels $T_{Ctr}$, $T_{BR}$ in the temporal reference picture as shown in FIG. 1. In FIG. 1, pixel $T_{Ctr}$ is located at a lower-right position of the center of the temporal collocated block. Pixel $T_{BR}$ is located across the bottom-right corner of the temporal collocated block. Similarly, the temporal sample candidates may also include other temporal reconstructed pixels.

Inter-View Sample Candidates

The inter-view neighboring pixels are those pixels collocated with the current block in the inter-view reference picture, such as pixels $I_{Ctr}$, $I_{BR}$ in the inter-view reference picture as shown in FIG. 1. In FIG. 1, pixel $I_{Ctr}$ is located at a lower-right position of the center of the inter-view collocated block (also referred to as inter-view corresponding block). Pixel $I_{BR}$ is located across the bottom-right corner of the inter-view collocated block. Similarly, the inter-view sample candidates may also include other inter-view reconstructed pixels.

Additional Sample Candidates

Furthermore, additional sample candidates can be used for the prediction process in the prediction process list. For example, the additional sample candidates can be one or more samples with default value(s) such as zero, middle value of the maximum allowed value, the maximum allowed value, the maximum of the neighboring pixels, the majority of the neighboring pixel, or the median of the neighboring pixels. The additional sample candidates may also correspond to one or more modified samples based on the sample derived from one or more neighboring samples. For example, an additional sample candidate can be derived by adding a constant value to one of the neighboring sample candidates. To extend the spirit of deriving the additional sample candidates from the neighboring reconstructed pixels, the additional candidates can also be derived from a look-up table that stores the top N majority pixel values. The look-up table can be designed based on the statistics of different levels such as sequence level, picture level, slice level, coding block level (e.g. coding unit in HEVC) or prediction block level (e.g. prediction unit in HEVC).

Residual Signaling of Simple Intra Mode

The prediction residual can be selectively signaled for the Simple Intra Mode. When the residual is signaled for the Simple Intra Mode, the conventional residual quad-tree transform and residual signaling in HEVC can be used to signal the residual. In another embodiment, only a delta DC (i.e., difference between the DC value of the block and the predicted DC) is signaled for the entire block coded in the Single Sample Mode as the residual.

Signaling of Simple Intra Mode

A flag can be used to signal the enabling/disabling of the Simple Intra Mode. For example, the flag can be signaled in a coding unit (CU) to indicate the enabling/disabling of the Simple Intra Mode for the entire CU. The flag may also be signaled in a prediction unit (PU) to indicate the enabling/disabling of the Simple Intra Mode for the PU.

Furthermore, a high level syntax can also be signaled in a slice header, picture parameter set (PPS), sequence parameter set (SPS), video parameter set (VPS) to enable or disable the Single Sample Mode for the entire picture, sequence or video coding respectively.

Additional syntax can be signaled to indicate which prediction process is used to predict current block. For example, a prediction index for indicating the selected prediction process is signaled when the current block is coded as the simple Intra mode, where the prediction index can be context coded using a truncated unary (TU) binarization process. Alternatively, the selected prediction process can be indicated by a prediction index derived at the decoder side. In one example, if a size of the prediction process list for the current block is equal to or less than 1, a prediction index for indicating the prediction process selected is not signaled.

As described above, the prediction processes are selected from a pre-defined list of prediction processes containing single sample prediction mode or conventional Intra prediction method used in HEVC/H.265 without residual coding. The size of the prediction list is fixed or adaptively determined for the current block, and can be signaled in the bitstream in levels (e.g. coding unit, slice header, PPS, SPS or VPS) different from the level for the high level syntax, or can be determined implicitly according to a same derivation process at both an encoder side and a decoder side.

Restriction of Simple Intra Mode

The Simple Intra Mode can be selectively applied according to the information of the coding block such as the size of the coding block or the partitioning type of the coding block. For example, the Simple Intra Mode is only applied to the 32×32 and 64×64 CU (block). In another example, the Simple Intra Mode is only applied to the CU with partitioning type 2N×2N.

Encoder Decision of Simple Intra Mode

To decide whether Simple Intra Mode is enabled or disabled for current picture/slice, several methods are illustrated:

1. Encoder can collect statistics over the pixels of current picture. If the smooth area of current picture is larger than a threshold, the Simple Intra Mode is enabled for current picture/slice. Otherwise, the Simple Intra Mode is disabled for current picture/slice. The smooth area detection can be realized in different ways. For example, encoder can simply calculate the histogram of the pixels of current picture. If the total number of the top N majority pixel values is larger than a threshold, the Simple Intra Mode is enabled for the current picture/slice. Otherwise, the Simple Intra Mode is disabled.

2. Encoder simply decides whether the Simple Intra Mode is enabled or disabled for current picture/slice depends on the statistics of the previously reconstructed picture. In one example, the statistics is only from the previously reconstructed picture with temporal layer equal to the current temporal layer minus one. Exemplary pseudo codes incorporating the above embodiment are illustrated in Table 1.

TABLE 1

If current temporal layer =0
{
    enable Simple Intra Prediction Mode;
}
Else
{
    If the Simple Intra Prediction Mode enabling ratio in the previously recon.
        Pic with (current temporal layer −1) > Threshold
        enabled Simple Intra Prediction Mode;
    Else
        disable Simple Intra Prediction Mode;
}

Miscellaneous of Simple Intra Mode

The Simple Intra Mode can be viewed as Intra prediction mode and specifically an angular Intra mode (e.g. DC mode as defined in HEVC/H.265) so that the following Intra blocks can be used to predict the Intra modes using the current Simple Intra Mode coded block.

In another scheme, the Simple Intra Mode can be viewed as an Intra prediction mode according to the selected prediction processes. For example, if the selected Intra prediction process is single sample mode using a left neighboring pixel, following one or more Intra blocks can predict their Intra modes by treating this block as DC mode. If the selected Intra prediction process is the conventional Intra prediction method using one specific prediction mode, the following Intra blocks can predict their Intra modes by treating this block as that Intra prediction mode.

In non I-Slice (e.g. P-Slice or B-Slice), the Simple Intra Mode can use the temporal or inter-view candidates for generating the predictor. In I-Slice, the Simple Intra Mode only uses the spatial candidate for generating the predictor.

Examples of Simple Intra Mode

Figure 2:
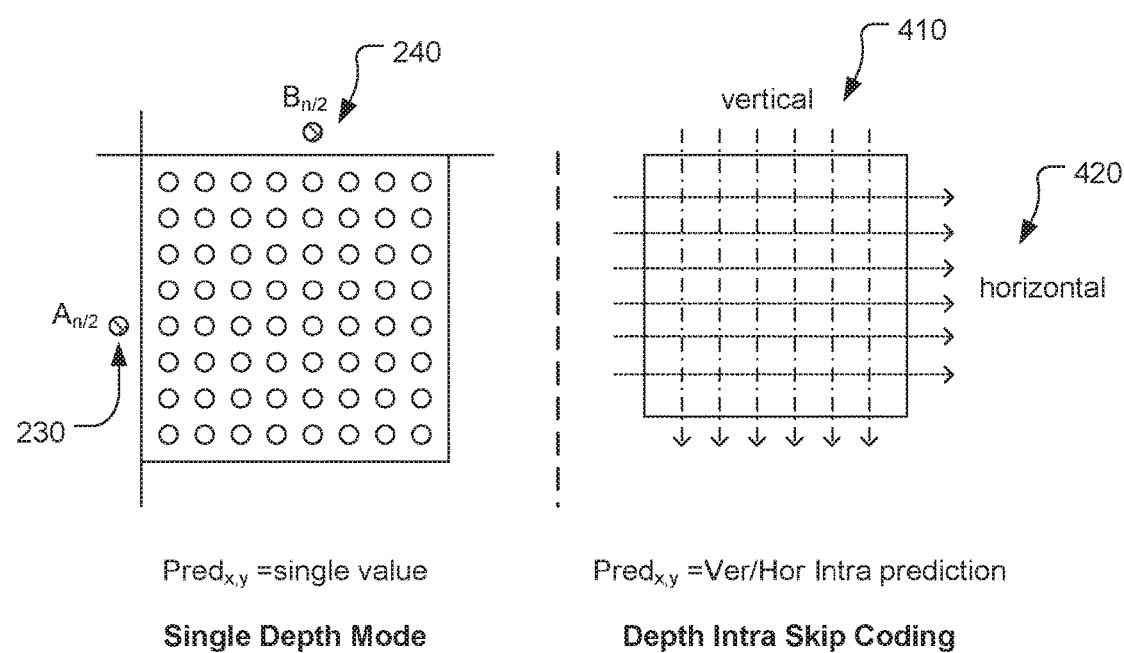
FIG. 2 illustrates an example of Simple Intra Mode, where the size of the prediction process list is fixed to 4 and the prediction list contains Intra vertical, Intra horizontal, a single sample from left-middle neighbor pixel and a single sample from the above-middle neighbor pixel.

FIG. 2 illustrates an example of Simple Intra Mode, where the size of the prediction process list is fixed (e.g. 4, which can be pre-specified or signaled in the bitstream) and the prediction list contains Intra vertical (210), Intra horizontal (220), single sample from left-middle neighbor pixel, $A_{n/2}$ (230) and single sample from the above-middle neighbor pixel, $B_{n/2}$ (240). The Intra vertical and Intra horizontal prediction is generated using the same method as used in HEVC/H.265, but without residual coding.

In this example, when the prediction index is equal to 0, the Intra vertical prediction mode is used to generate the predictor. When prediction index is equal to 1, the Intra horizontal prediction mode is used to generate the predictor. When prediction index is equal to 2, the single sample mode with the sample value of $A_{n/2}$ is used to generate the predictor. When prediction index is equal to 3, the single sample mode with the sample value of $B_{n/2}$ is used to generate the predictor. Note that when the neighboring pixel is not available, a single sample mode with default sample value (e.g. 128, the middle value of the maximum allowed value for an 8-bits input sequence) can be used instead.

As mentioned previously, the prediction process can be inserted into the prediction list at any predetermined order. In another example, the order can be Intra vertical prediction mode, Intra horizontal prediction mode, single sample mode with the above-middle neighbor pixel ($B_{n/2}$) as the predictor and single sample mode with left-middle neighbor pixel ($A_{n/2}$) as the predictor.

Figure 3:
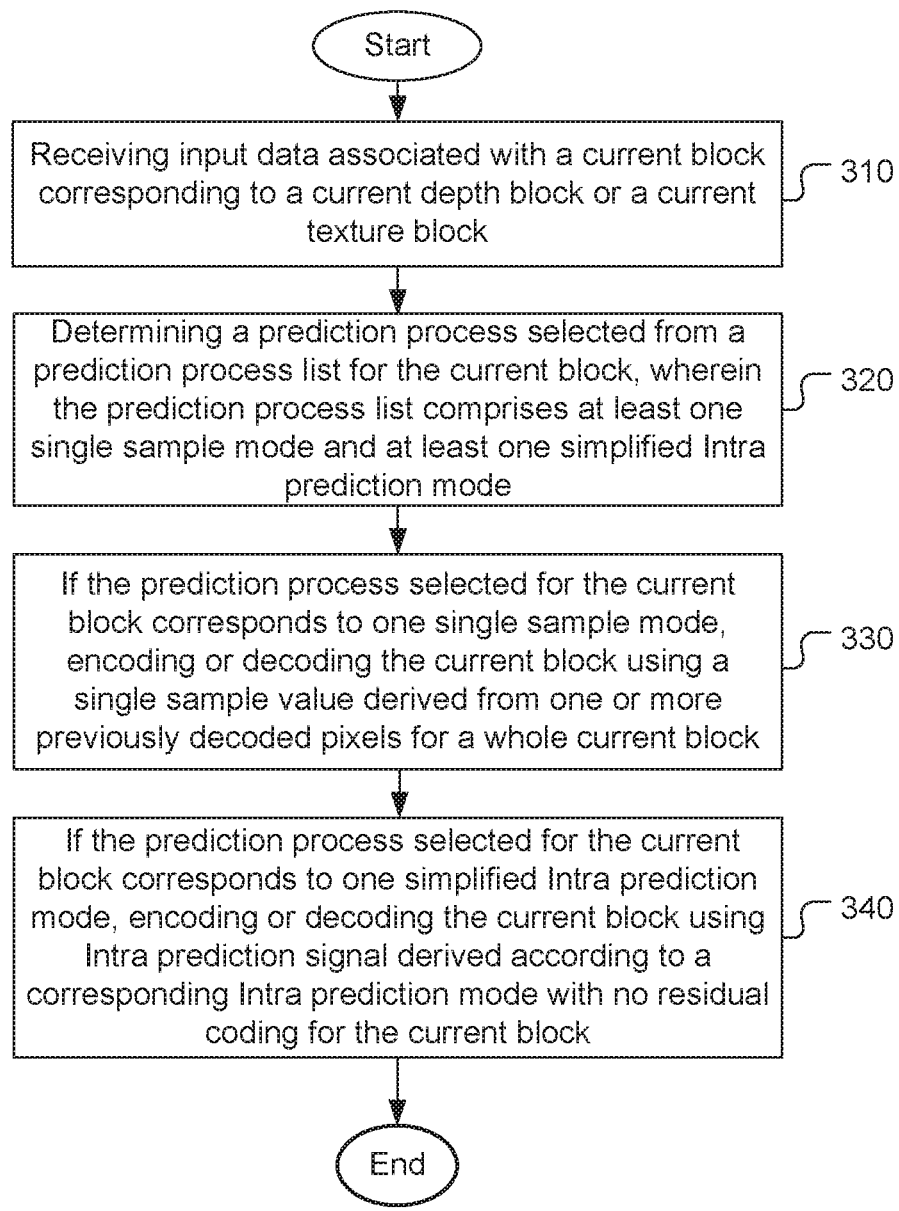
FIG. 3 illustrates an exemplary flowchart for coding for a block of depth data or texture data uses a simple Intra mode according to an embodiment of the present invention.

FIG. 3 illustrates an exemplary flowchart for coding for a block of depth data or texture data uses a simple Intra mode according to an embodiment of the present invention. The system receives input data associated with a current block corresponding to a current depth block or a current texture block as shown in step 310. The input data may correspond to pixel data or depth data of the current block to be coded at the encoder side or the coded pixel data or depth data of the current block to be decoded at the decoder side. The input data may be retrieved from storage such as a computer memory of buffer (RAM or DRAM) or received from a processor such as a processing unit or a digital signal. A prediction process selected from a prediction process list is determined for the current block in step 320, where the prediction process list comprises at least one single sample mode and at least one simplified Intra prediction mode. If the prediction process selected for the current block corresponds to one single sample mode, the current block is encoded or decoded using a single sample value derived from one or more previously decoded pixels for a whole current block as shown in step 330. If the prediction process selected for the current block corresponds to one simplified Intra prediction mode, the current block is encoded or decoded using Intra prediction signal derived according to a corresponding Intra prediction mode with no residual coding for the current block as shown in step 340.

The flowcharts shown above are intended to illustrate examples of coding a depth block or a texture block using Simple Intra Mode for a video encoder and a decoder incorporating embodiments of the present invention. A person skilled in the art may modify each step, re-arranges the steps, split a step, or combine the steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video coding for a block of depth data or texture data using a simple Intra mode, the method comprising:
   receiving input data associated with a current block corresponding to a current depth block or a current texture block;
   determining a prediction process selected from a prediction process list for the current block, wherein the prediction process list comprises at least one single sample mode and at least one simplified Intra prediction mode;
   if the prediction process selected for the current block corresponds to one single sample mode, encoding or decoding the current block using a single sample value derived from one or more previously decoded pixels for a whole current block; and
   if the prediction process selected for the current block corresponds to one simplified Intra prediction mode, encoding or decoding the current block using Intra prediction signal derived according to a corresponding Intra prediction mode with no residual coding for the current block; wherein a size of the prediction process list is fixed or adaptively determined for the current block; wherein the size of the prediction process list for the current block is fixed to a positive integer number N, and N is pre-specified or signaled in a bitstream; wherein when a number of available prediction processes is less than N, another single sample mode with one or more additional candidates or default candidates is added to the prediction process list.

2. The method of claim 1, wherein the prediction process selected is indicated by a prediction index derived or signaled for the current block.

3. The method of claim 2, wherein the prediction index is signaled when the current block is coded as the simple Intra mode.

4. The method of claim 2, wherein the prediction index is context coded using a truncated unary (TU) binarization process.

5. The method of claim 1, wherein if a size of the prediction process list for the current block is equal to or less than 1, a prediction index for indicating the prediction process selected is not signaled.

6. The method of claim 1, wherein the prediction process list is constructed for the current block by inserting different prediction processes in a predefined order into the prediction process list.

7. The method of claim 1, wherein the single sample value and/or the Intra prediction signal correspond to one or more spatial sample candidates, one or more temporal sample candidates or one or more inter-view sample candidates.

8. The method of claim 1, wherein the single sample value and/or the Intra prediction signal corresponds to one or more additional candidates derived by adding an offset value to one or more available texture candidates, or corresponds to one or more additional candidates with a default sample value.

9. The method of claim 8, wherein a same offset value is added to all color components of each of said one or more available texture candidates or different offset values are added to different color components of each of said one or more available texture candidates.

10. The method of claim 1, wherein the single sample value and/or the Intra prediction signal corresponds to one or more additional candidates derived by adding an offset depth value to an available depth candidate or corresponds to one or more additional candidates with a default sample value.

11. The method of claim 1, wherein one or more syntax elements are signaled to control enabling or disabling of the simple Intra mode.

12. The method of claim 11, wherein said one or more syntax elements are signaled in a coding unit (CU).

13. The method of claim 1, wherein the size of the prediction process list for the current block is determined implicitly according to a same derivation process at both an encoder side and a decoder side.

14. The method of claim 1, wherein the size of the prediction process list for the current block is signaled explicitly in a bitstream at a sequence level, a view level, a picture level, a slice level or a block level.

15. The method of claim 1, wherein when a number of available prediction processes is larger than N, only first N prediction processes according to a priority order are included in the prediction process list.

16. The method of claim 15, wherein the priority order is pre-defied or adaptively derived according to statistics of prediction index indicating the prediction process selected for coded blocks.

17. An apparatus for video coding to code a block of depth data or texture data using a simple Intra mode, the apparatus comprising one or more electronic circuits arranged to:
receive input data associated with a current block corresponding to a current depth block or a current texture block;
determine a prediction process selected from a prediction process list for the current block, wherein the prediction process list comprises at least one single sample mode and at least one simplified Intra prediction mode;
if the prediction process selected for the current block corresponds to one single sample mode, encode or decode the current block using a single sample value derived from one or more previously decoded pixels for a whole current block; and
if the prediction process selected for the current block corresponds to one simplified Intra prediction mode, encode or decode the current block using Intra prediction signal derived according to a corresponding Intra prediction mode with no residual coding for the current block; wherein a size of the prediction process list is fixed or adaptively determined for the current block; wherein the size of the prediction process list for the current block is fixed to a positive integer number N, and N is pre-specified or signaled in a bitstream; wherein when a number of available prediction processes is less than N, another single sample mode with one or more additional candidates or default candidates is added to the prediction process list.

* * * * *